United States Patent [19]
Loewen

[11] Patent Number: 6,033,578
[45] Date of Patent: Mar. 7, 2000

[54] ENGINE OIL FILTER AND METHOD FOR REMOVING SAME

[76] Inventor: Gordon Edward Loewen, Site G, Comp 32, R.R. 2 Station Main, Nanaimo, British Columbia, Canada, V9R 5K2

[21] Appl. No.: 08/960,922

[22] Filed: Oct. 30, 1997

[51] Int. Cl.[7] .................................................. B01D 35/16
[52] U.S. Cl. ......................... 210/767; 210/248; 210/444; 210/DIG. 17
[58] Field of Search .................................... 210/248, 409, 210/DIG. 17, 440, 444, 767; 123/196 A; 141/115, 116; 184/1.5, 6.24

[56] References Cited

U.S. PATENT DOCUMENTS

| | | | |
|---|---|---|---|
| 3,342,339 | 9/1967 | Riolo | 210/DIG. 17 |
| 5,094,201 | 3/1992 | Bedi | 123/196 A |
| 5,246,086 | 9/1993 | Yunick | 123/196 A |
| 5,462,679 | 10/1995 | Verdegan et al. | |

*Primary Examiner*—Matthew O. Savage
*Attorney, Agent, or Firm*—John Russell Uren

[57] ABSTRACT

Method for removing an oil filter from an engine when the filter is to be replaced or removed and apparatus for assisting such oil filter removal. An air valve is positioned on the casing of the oil filter and air is injected into the volume of the oil filter surrounding the internal filter. The air displaces oil in the oil filter. This reduces the quantity of oil in the oil filter and, after the air chuck and compressed air line are removed from the air valve, allows the oil filter to be removed without dripping oil on the floor of the garage or on the operator performing the servicing of the oil filter.

10 Claims, 2 Drawing Sheets

ENGINE OIL FILTER AND METHOD FOR REMOVING SAME

This invention relates to removing an engine oil filter and, more particularly, to removing an engine oil filter following an air injection operation in order to reduce oil wastage and spills.

BACKGROUND OF THE INVENTION

Oil filters to remove impurities from engine oil are found in virtually all internal combustion engines of the four cycle type. Such oil filters are removed and are replaced or cleaned often during the life of the engine thereby cleaning the oil circulating within the engine and extending engine life.

Typically, the oil filter is removed and replaced during scheduled maintenance sessions at a garage or other automotive or truck service center by mechanics or others who service such engines. In the course of a workday, many such filters are removed and replaced.

When the filter is removed, it is usually filled with oil because the filter is positioned on the bottom of the engine. The axis of the filter is rarely vertical because the filter may be located by the engine designers to be in a most convenient place for removal and position of the filter in that location is not of primary concern. Even if the filter is vertical, however, oil is usually spilled from the filter during removal. This spillage runs over the user who is handling the filter and onto the floor or undercarriage of the vehicle on which the filter is installed. It is inconvenient, environmentally contaminating and inefficient since the spillage must be cleaned. It is also a nuisance.

There is disclosed in Verdegan et al U.S. Pat. No. 5,462,679 an air inlet on the casing of an oil filter. Verdegan et al teach using compressed air to clean the oil filter so it may be reused. The air must be injected into the central area or cavity of the oil filter because a back or reverse flow is needed to clean the filter and, thereafter, the oil is drained from a drainplug.

SUMMARY OF THE INVENTION

According to one aspect of the invention, there is provided a method for evacuating engine oil from an oil filter of an engine, said oil filter having a casing and a filter, said method comprising forcing compressed air through an air valve mounted on said casing of said oil filter into the volume outside said filter and inside said casing and displacing a portion of said engine oil from said oil filter into said engine thereby to reduce the quantity of oil in said oil filter.

According to a further aspect of the invention, there is provided an oil filter for an engine, said oil filter being operable to receive oil under pressure from said engine and to filter said received oil, said oil filter having an internal filter with an inside and an outside, said oil filter comprising a casing, a one way air valve in said casing, said inside of said casing and said outside of said internal filter defining a first volume to hold oil, said inside of said internal filter defining a central area of a second volume to hold oil, said valve having an outlet communicating with said first volume, said valve being operable to receive air under pressure and transfer it to said first volume thereby to provide air to said first volume and to displace said oil.

BRIEF DESCRIPTION OF THE SEVERAL VIEWS OF THE DRAWINGS

Specific embodiments of the invention will now be described, by way of example only, with the use of drawings in which.

DESCRIPTION OF SPECIFIC EMBODIMENT

Figure 1:
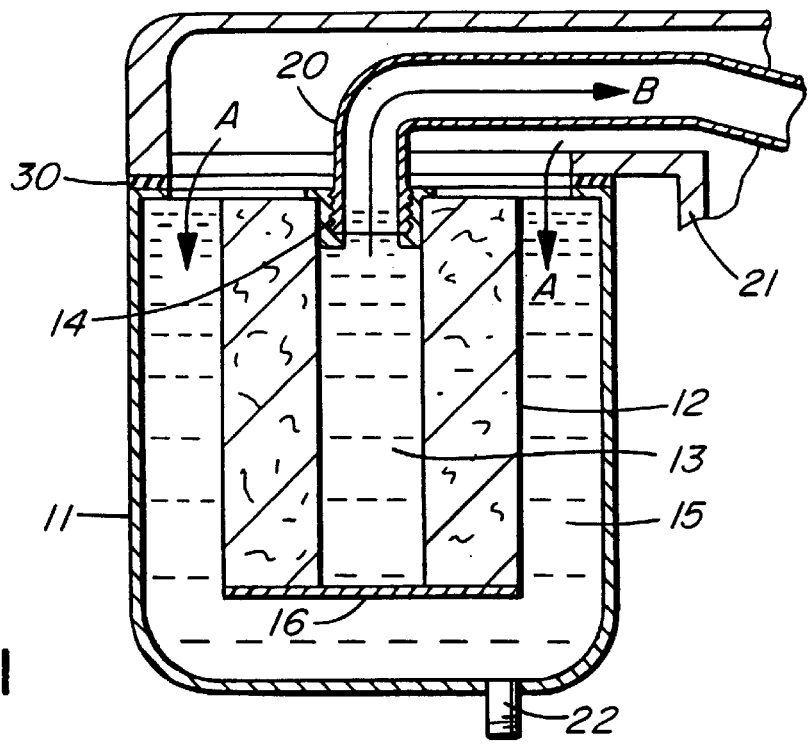
FIG. 1 is a cross-sectional side view of an oil filter according to the invention in operating position on an engine.

With reference now to the drawings, an oil filter according to the invention is generally illustrated at 10 in FIG. 1. It comprises a generally cylindrical casing 11 and a filter 12 within the casing 11. The oil filter 10 surrounds the oil passageway 13 which is defined at one end by a threaded connection 14 within the oil filter 10 which is threadedly connected to a complementary oil pipe or tubing 20 which extends from the engine 21 on which the oil filter 10 is mounted. The central passageway 13 defines a first volume which is isolated from the circumferential second volume 15 surrounding the filter 12 by a plate 16. Plate 16 prevents contamination or unclean oil from travelling back into the engine 21 without travelling through internal filter 12 and also prevents the air introduced to the oil filter 12 through the air valve 22 from entering the central passageway 13 except through the circumferential second volume 15 as will be explained.

A one way air valve 22 is connected to the casing 11 of the oil filter 10. Air valve 22 allows compressed air to be passed from a compressed air line 23 (FIG. 2) and air chuck 24 mounted thereon to be passed to the interior of the oil filter 10 in second volume 15 as will be described in greater detail.

A seal 30, conveniently rubber, is mounted in the upper area of the oil filter 10. Seal 30 is compressed between the oil filter 10 and an adjoining and complementary shoulder on the engine 21 and prevents leakage from the oil filter 10.

OPERATION

In operation, it will be assumed that a new oil filter 10 has been connected to the engine 21 and that it is now time for servicing to commence by way of removing and replacing the oil filter 10. It will be appreciated that under operating conditions, oil travels from the engine 21 through passageways "A" (FIG. 1) into oil filter 10, through filter 12 and back to engine 21 through central passageway "B".

The operator will connect a removable air chuck 24 (FIG. 2) to the air valve 22. Air chuck 24 is connected to a compressed air line 23 such as is common in commercial garages, automobile repair bays, service stations and the like. Compressed air having a pressure of 30–40 p.s.i. has been found to operate in a satisfactory manner.

Figure 2:
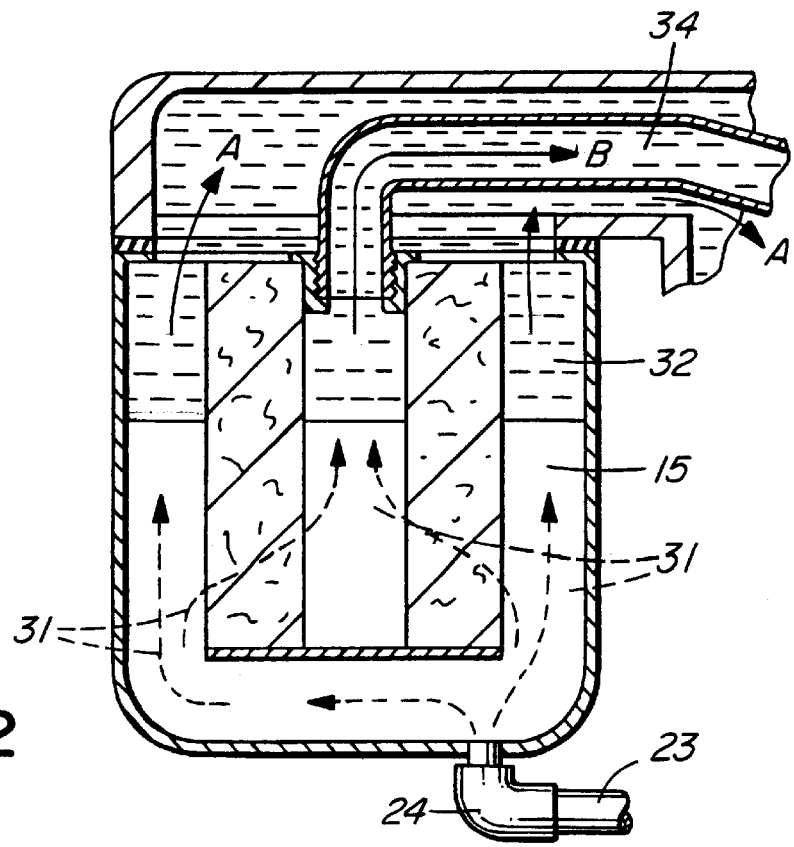
FIG. 2 is a cross-sectional side view of an oil filter according to the invention but illustrating the compressed air line connected to the air valve of the oil filter and the air bubbles displacing the oil in the oil filter according to the invention.
Figure 3:
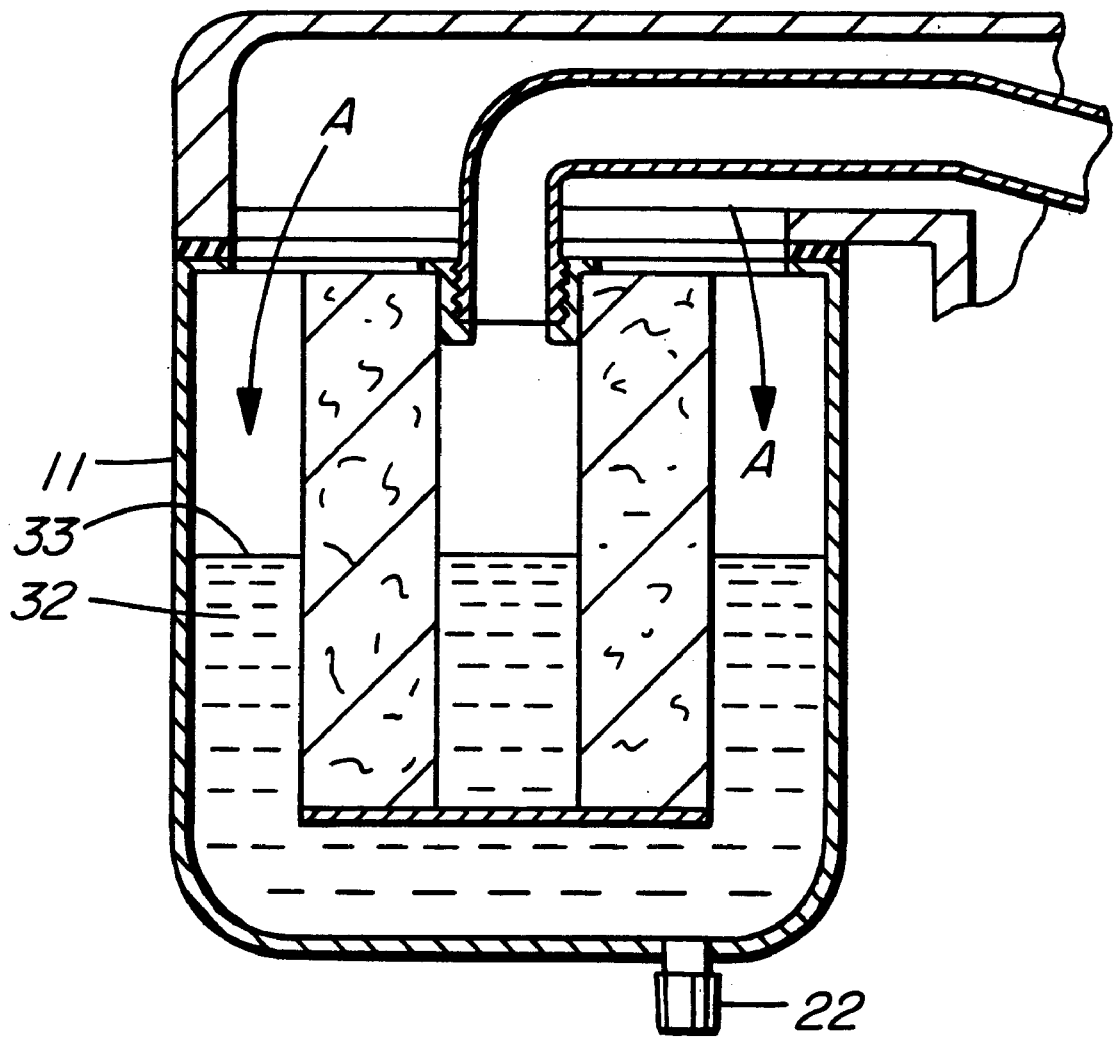
FIG. 3 is a cross-sectional side view of the oil filter of FIG. 1 following the removal of the compressed air line and the injection of the compressed air just prior to oil filter removal.

The flow of compressed air is then initiated and, as will be seen from FIG. 2, an air pocket 31 is formed which displaces a certain volume of the oil in the oil filter 10 upwardly and through the passageways A (FIG. 2) to the engine 21 as illustrated, the back pressure being less in passageways A than in the central passageway 34. The air 31 is prevented from entering the central passageway 13 except through the filter 12 from the circumferential second volume 15 by the use of plate 16.

The compressed air is then terminated and the air chuck 24 connected to the compressed air line 23 is removed from the valve 22. Valve 22 is a one way valve thereby prohibiting any of the contents of the oil filter 10 to escape from the valve 22. The oil 32 remaining in the oil filter 10 will be reduced to a quantity less than the original amount in oil filter 10 thereby lowering the surface 33 of the oil 32 to well below the original surface location. The operator will then rotate the oil filter 10 in order to remove it from the threaded pipe 20 to which it is connected. Thus, only a relatively small amount of oil will drain from the oil filter 10 upon its removal thereby preventing the wastage, contamination and inconvenience otherwise encountered.

While specific embodiments of the invention have been described, such descriptions should be taken as illustrative of the invention only and not as limiting its scope as defined in accordance with the accompanying claims.

I claim:

1. Method for evacuating engine oil from an oil filter of an engine, said oil filter having a casing and a filter, said oil filter having inlet and outlet openings, said openings facing generally upwardly in said oil filter, said method comprising injecting compressed air through a one-way air valve on said casing of said oil filter having an outlet adjacent a volume outside said filter and inside said casing and displacing a portion of said engine oil from said oil filter into said engine thereby to reduce the quantity of oil in said oil filter.

2. Method as in claim 1 and further comprising removing said oil filter from said engine with said reduced quantity of oil within said filter.

3. Method as in claim 2 wherein said oil filter is removed from said engine by rotating said oil filter on a threaded connection.

4. Method as in claim 3 wherein said air injected into said oil filter displaces oil from the volume surrounding said filter.

5. Method as in claim 2 wherein said oil displaced from said oil filter by said air injected into said air filter is approximately one-half of the oil held by said oil filter.

6. Method as in claim 1 wherein said air is injected into said volume of said oil filter surrounding the outside of said oil filter.

7. Oil filter apparatus for an engine being operable to receive oil under pressure from said engine through an inlet filter opening to filter said received oil and to exhaust said oil to said engine from an outlet filter opening, said inlet and said outlet filter openings facing generally upwardly, said oil filter apparatus comprising a casing, said casing having an inside and an outside, an oil filter internal of said casing, said filter having an inside and an outside, a one-way air valve in said casing being operable to allow air to pass through said valve into said casing, said inside of said casing and said outside of said internal oil filter defining a first volume to hold oil, said inside of said internal oil filter defining a central area having a second volume to hold oil, said air valve having an inlet adapted to receive air from an air chuck connected to an external air source and an outlet adjacent to said first volume, said air valve being operable to receive air under pressure at said inlet and to transfer said air to said first volume from said outlet thereby to displace said oil within said first volume.

8. Oil filter apparatus as in claim 7 wherein said oil filter apparatus is connected to said engine, said connection between said oil filter and said engine being a threaded connection.

9. Oil filter apparatus as in claim 8 wherein said one-way valve is connected on a bottom of said casing.

10. Oil filter apparatus as in claim 7 wherein said central area of said oil filter defining said second volume is isolated from said first volume of said oil filter thereby to prevent oil travelling to said second volume from said engine without passing through said oil filter.

* * * * *